US007026723B2

(12) United States Patent
Moreno

(10) Patent No.: US 7,026,723 B2
(45) Date of Patent: Apr. 11, 2006

(54) AIR FILTERING CHIMNEY TO CLEAN POLLUTION FROM A CITY AND GENERATE ELECTRIC POWER

(75) Inventor: Mauricio Rodolfo Moreno, Santiago (CL)

(73) Assignee: Handels und Finanz AG, Panama (PA)

( * ) Notice: Subject to any disclaimer, the term of this patent is extended or adjusted under 35 U.S.C. 154(b) by 67 days.

(21) Appl. No.: 10/750,955

(22) Filed: Jan. 5, 2004

(65) Prior Publication Data

US 2004/0183309 A1 Sep. 23, 2004

Related U.S. Application Data

(60) Provisional application No. 60/439,642, filed on Jan. 14, 2003.

(51) Int. Cl.
*F03D 5/00* (2006.01)

(52) U.S. Cl. ............................ 290/55; 290/44; 290/54; 60/398

(58) Field of Classification Search .................. 290/43, 290/44, 54, 55; 60/641, 389, 650
See application file for complete search history.

(56) References Cited

U.S. PATENT DOCUMENTS 3,436,908 A * 4/1969 VanDelic .................... 126/634
3,894,393 A * 7/1975 Carlson ..................... 60/641.1
4,033,126 A * 7/1977 Newland ..................... 60/398
4,367,627 A * 1/1983 Pretini ..................... 60/641.12
4,475,342 A * 10/1984 Assaf ........................ 60/641.6
4,481,774 A * 11/1984 Snook ...................... 60/641.14
4,497,177 A * 2/1985 Anderson ................ 60/641.12
4,801,811 A * 1/1989 Assaf et al. .................. 290/55
5,395,598 A * 3/1995 Prueitt ........................ 422/168
5,608,268 A 3/1997 Senanayake ................. 290/54
6,057,606 A * 5/2000 Porat ........................... 290/55
6,437,457 B1 * 8/2002 Roskey ........................ 290/55
6,647,717 B1 * 11/2003 Zaslavsky et al. ............ 60/398
6,696,766 B1 * 2/2004 Mamo ........................ 290/1 R
6,911,744 B1 * 6/2005 Roskey ........................ 290/55

FOREIGN PATENT DOCUMENTS

FR 2436268 5/1980

* cited by examiner

*Primary Examiner*—Nicholas Ponomarenko

(57) ABSTRACT

A solar chimney assembly including a chimney (3) is build using a mountain (11) as support. The chimney (3) receives air from a solar heat collector (1) that heats the air below it creating an updraft of air. The air goes up because of the difference in temperature and the difference of pressure between the base and the top of the chimney. This higher the difference of temperature and pressure, the faster the air will go up. An array of turbines (2) is driven by the air. The chimney (3) will be as high as the mountain (approximately 1,000 meters high or higher) and will go above the inversion layer or thermic ceiling (10). At the top of the chimney, a fine mist of electrically charged water (5), taken from a reservoir (4) is sprayed across the top of the tower, attracting pollution in the air like sulfur dioxide, soot and other particles. The water will fall because of gravity and will be collected in a second reservoir (6) and will be used to send it down the mountain through a pipe (7) to generate additional electric power with a turbine (8).

2 Claims, 2 Drawing Sheets

AIR FILTERING CHIMNEY TO CLEAN POLLUTION FROM A CITY AND GENERATE ELECTRIC POWER

MAURICIO R. MORENO ROJAS

10/750,955

AIR FILTERING CHIMNEY TO CLEAN POLLUTION FROM A CITY AND GENERATE ELECTRIC POWER

This application claims the benefit of Provisional application Ser. No. 60/439,642, filed Jan. 14, 2003.

STATEMENT REGARDING FEDERALLY SPONSORED RESEARCH OR DEVELOPMENT

This invention is not Federally Sponsored for Research or Development.

BACKGROUND OF THE INVENTION

1. Field of the Invention

This invention relates to a solar chimney arrangement. A solar chimney arrangement typically includes a solar chimney having an associated wind turbine, the wind turbine being energised in response to an updraft of solar-heated air in the chimney. Such an arrangement can be environmentally friendly.

2. Description of Related Art

In a known form of solar chimney, the air for use in the updraft is solar-heated beneath a glass collector roof. To obtain a volume of heated air sufficient to effect sustained operation of a wind turbine of a size suitable for the commercial generation of electricity, the collector roof needs to cover a large land area, and is of a construction both expensive to erect and costly to maintain.

French patent 2,436,268 shows a chimney having a solar panel around its base, to form an air-heating chamber, whereby the air circulates normally i.e by natural in-draught from the outside to the inside of the container, to rise in the chimney stack.

U.S. Pat. No. 3,894,393 describes a chimney using a mountain as support, wherein an enclosed air mass is cooled at high altitude below the temperature of the surrounding air. The cooler, denser air flows down the duct towards lower altitude. It shows an evaporative spray at the top of the duct to cool the incoming air. This system differs from a solar chimney proposing a completely different result of a downward air flow and spraying the air at the top in order to create this effect.

It is the object of this invention to improve upon the efficiency of the known solar collection systems, by increasing the temperature difference between the base and the top of the chimney, generating an upward air flow, with an arrangement of air turbines generators at the lower part of the chimney that will extract the energy of the upcoming air and produce electric power, decreasing the construction cost reaching higher altitudes and using an evaporative spray designed to capture the polluted particles in the air and as result, clean and filter the polluted air from a city.

From one aspect of the invention we now propose a solar chimney arrangement which includes an air cleaning system by means of spraying a fine mist of electrically charged water, sprayed across the top of the tower, attracting pollution in the air like sulfur dioxide, soot and other particles.

From another aspect of the invention we propose a solar chimney arrangement in which a solar chimney is build using a mountain as support reaching higher altitudes increasing the pressure difference and improving the efficiency of the system. This will allow the chimney to build the chimney up to 2,000 meters above the base of the chimney.

The temperature difference can be increased by building the chimney so as the top of the chimney will be above the thermic ceiling.

SUMMARY OF THE INVENTION

A solar chimney assembly including a chimney (3) is build using a mountain (11) as support. The chimney (3) receives air from a solar heat collector (1) that creates an updraft flow of air and an arranged of turbine (2) is driven by the air. The chimney (3) will be as high as the mountain (approximately 1,000 meters high or higher) and will go above the inversion layer or thermic ceiling (10). At the top of the chimney, a fine mist of electrically charged water (5), taken from a reservoir (4) is sprayed across the top of the tower, attracting pollution in the air like sulfur dioxide, soot and other particles. The water will fall because of gravity and will be collected in a second reservoir (6) and will be used to send it down the mountain through a pipe (7) to generate electric power with a turbine (8). The electric power will be sent to the electric grid (9).

BRIEF DESCRIPTION OF THE DRAWINGS

The invention will be further described, by way of example, with reference to the accompanying drawing, which is a full view of the solar chimney arrangement, in which.

DETAILED DESCRIPTION OF THE INVENTION

Figure 1:
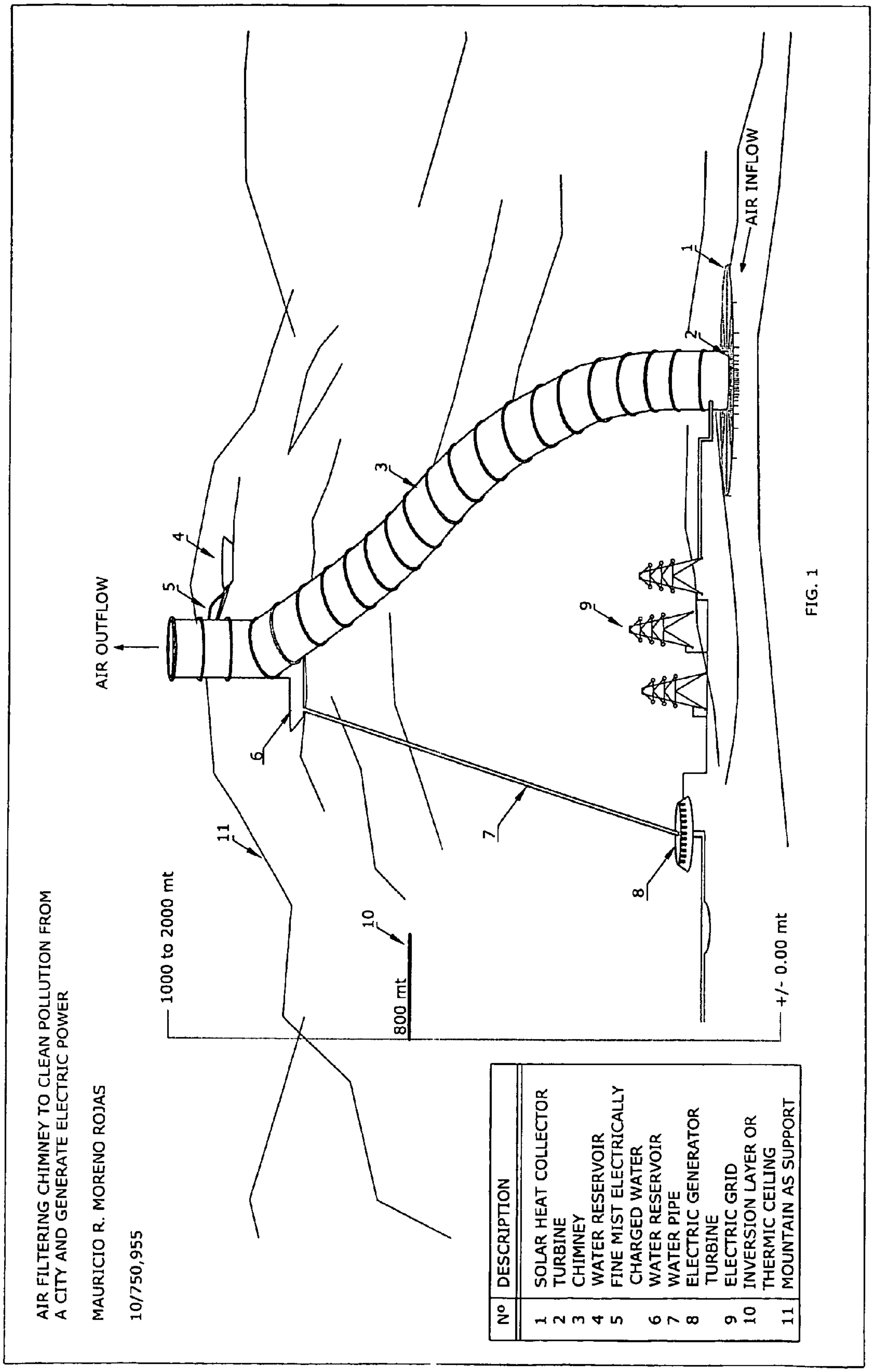
FIG. 1 is a view of the complete solar chimney using a mountain as support
Figure 2:
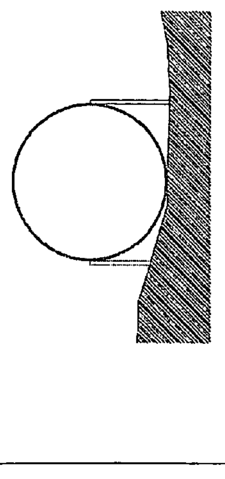
FIG. 2 is a cross-section of the chimney
Figure 3:
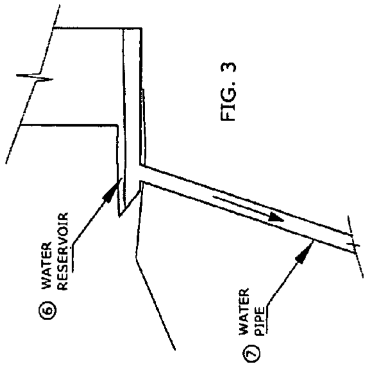
FIG. 3 is a cross-section of the water reservoir that receives the water that has captured the pollution particles
Figure 4:
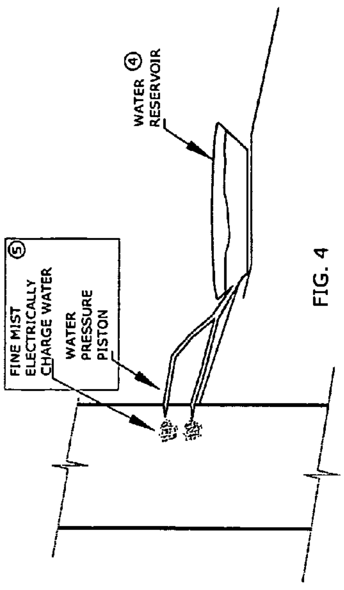
FIG. 4 is a cross-section of the reservoir and the system to spray the fine mist of electrically charge water
Figure 5:
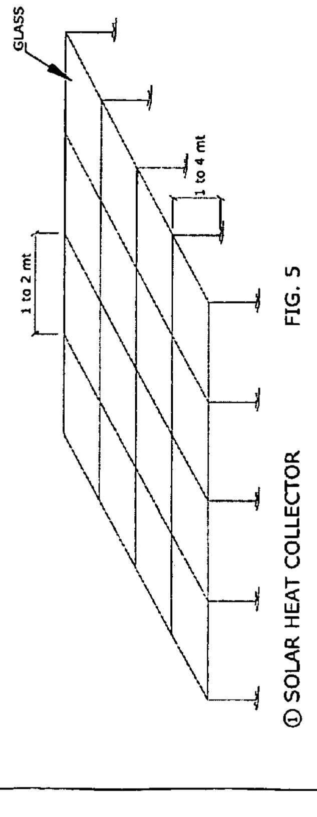
FIG. 5 is a view of the solar heat collector that will heat the air below it by means of solar radiation creating the updraft of air
Figure 6:
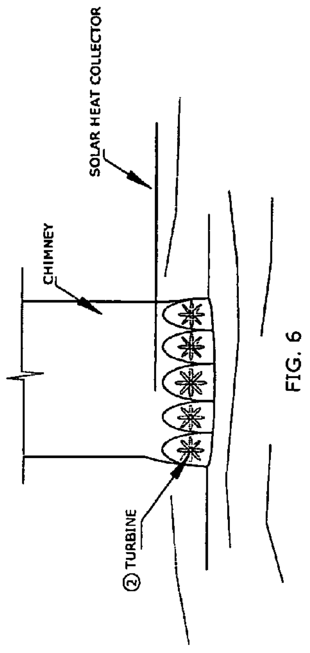
FIG. 6 is a side view partly in section of the base of the chimney with an array of turbines beneath the solar collector that will use the velocity of the upcoming air to extract the energy in it and convert it with generators into electric power.

A solar chimney assembly including a chimney (3) is build using a mountain (11) as support. The chimney (3) receives air from a solar heat collector (1) that heats the air below it creating an updraft of air. The air goes up because of the difference in temperature and the difference of pressure between the base and the top of the chimney. This higher the difference of temperature and pressure, the faster the air will go up. An array of turbine (2) is driven by the air. The chimney (3) will be as high as the mountain (approximately 1,000 meters high or higher) and will go above the inversion layer or thermic ceiling (10). At the top of the chimney, a fine mist of electrically charged water (5), taken from a reservoir (4) is sprayed across the top of the tower, attracting pollution in the air like sulfur dioxide, soot and other particles. The water will fall because of gravity and will collect in a second reservoir (6) and will be used to send it down the mountain through a pipe (7) to generate electric power with a turbine (8).

At the base of the chimney a solar heat collector (1) is build to heat the incoming air. This collector will have a glass collector roof and will use a surrounding area.

The result will be that because of the pressure difference at higher altitudes and the temperature difference, the air will go up achieving high speeds. At the bottom of the chimney a turbine or an array of wind turbines (2) will generate electric power moved by the upward air.

At the top of the chimney a fine mist of electrically charged water (5), sprayed across the top of the tower, would attract pollution in the air like sulfur dioxide, soot and other particles.

To collect the smog-filled mist, a second set of sprayers would send larger water droplets into the air to bond with the smaller pollution-laden mist particles. These droplets would become heavy and fall into collection trays. The water will be collected in a reservoir (6) and will be used to send it down the mountain through a pipe (7) to generate electric power with a turbine (8). After the turbine, the water will be treated and cleaned before dispatching it.

In the cases where no water is available at the top of the mountains or costs are too high to elevate the water using pumps, the fine mist of electrically charged water can be applied at the bottom. In this case, the mist would be with hot water to avoid a drop in temperature that could reduce the speed of the airflow.

This invention is designed for cities as Santiago de Chile that have certain characteristics: Polluted city, Smog is trapped in a large valley where the city lies, inversion layer or thermic ceiling above the city not allowing the smog to escape. In some cases like Santiago, there are mountains next to the city where the chimney can be build lowering the construction costs.

Chimney: The chimney can be build as a stand alone chimney or using a mountain as a support, which means that the chimney will have an angle. This will depend on the topographic characteristics of the site. The chimney will be build in concrete in the case of a stand alone chimney and in the mountain case, will be build using different materials including concrete, and alternative embodiments of plastic or polymeric materials, e.g., Kevlar, polymer, polyvinylchloride (PVC), polycarbonate, or similar materials. The use of these materials will increase the temperature of the air flowing through the chimney increasing its speed.

The heat collector will have a height above ground level of approximately 2 meters. The collector roof, can be constructed in glass, but in alternative embodiments of plastic or polymeric materials, e.g., KEVLAR.RTM. polymer, polyvinylchloride (PVC) or the like.

The turbine and generator will desirably be selected to be of a size to generate electrical power for supply to the national grid (9), but alternatively can be for local supply as to individual industrial units.

I claim:

1. A solar chimney arrangement, comprising:

A solar heat collector to heat the air below it,

A chimney build using a mountain as support permitting reaching heights of more than 1,000 meters above the base, to conduct the updraft of hot air coming from the solar collector, A set of turbines at the base of the chimney to generate electric power, An evaporative spray of water at the top of the chimney to capture the polluted particles in the air.

2. A solar chimney arrangement, comprising:

A solar heat collector to heat the air below it,

A chimney build using a mountain as support permitting reaching heights of more than 1,000 meters above the base, to conduct the updraft of hot air coming from the solar collector, A set of turbines at the base of the chimney to generate electric power, An evaporative spray of hot water at the bottom of the chimney to capture the polluted particles in the air.

* * * * *